Figure 1:
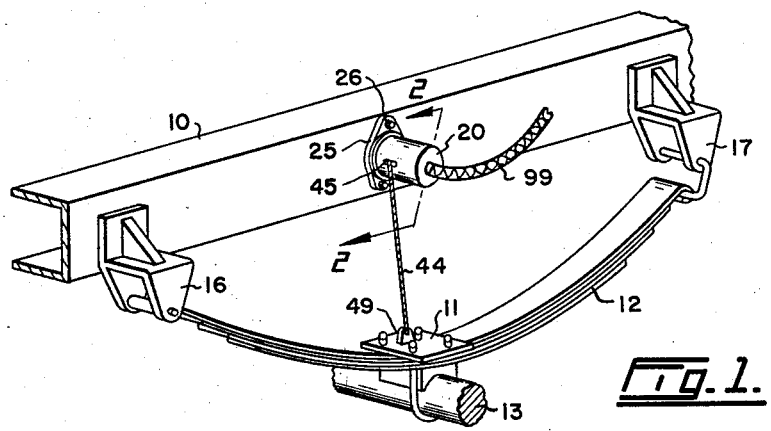

Nov. 5, 1963  H. C. DAVIS ET AL  3,109,505
LOAD MEASURING APPARATUS FOR VEHICLES
Filed Sept. 9, 1960  2 Sheets-Sheet 1

INVENTORS
HAROLD C. DAVIS
LESLIE H. JORDAN
JOHN ARDEN

BY Fetherstonhaugh & Co.
ATTORNEYS

Nov. 5, 1963    H. C. DAVIS ET AL    3,109,505
LOAD MEASURING APPARATUS FOR VEHICLES
Filed Sept. 9, 1960    2 Sheets-Sheet 2

INVENTORS
HAROLD C. DAVIS
LESLIE H. JORDAN
JOHN ARDEN
BY
Fetherstonhaugh & Co.
ATTORNEYS United States Patent Office 3,109,505
Patented Nov. 5, 1963

3,109,505
LOAD MEASURING APPARATUS FOR VEHICLES
Harold C. Davis, West Vancouver, British Columbia, Leslie H. Jordan, Vancouver, British Columbia, and John Arden, Burnaby, British Columbia, Canada, assignors to D. & W. Truck Load Indicator Ltd., Vancouver, British Columbia, Canada
Filed Sept. 9, 1960, Ser. No. 54,976
12 Claims. (Cl. 177—137)

This invention relates to a load measuring apparatus for vehicles.

An object of the present invention is the provision of apparatus for measuring or indicating the loads of vehicles which is preferably mounted on the vehicle, but which may be partially or completely made as a separate unit upon which a portion of the vehicle may rest.

An object of the present invention is the provision of load measuring apparatus to be mounted on a vehicle and incorporating means for protecting the apparatus from undue wear during the normal operation of the vehicle.

A further object is the provision of load weight measuring apparatus by means of which an indication may be obtained of the load on each wheel of a vehicle and of the entire load, and which incorporates means for quickly and easily adjusting the apparatus in accordance with variations in the load on each wheel when the vehicle is empty and/or the condition of said vehicle.

Another object is the provision of load measuring apparatus particularly for trailers which are normally drawn by separate traction units, said load measuring apparatus being such as to be placed under a portion of an end of the trailer when it is separated from its traction unit.

In the preferred form of the invention, the load measuring apparatus is mounted on a vehicle, such as a truck, trailer, bus or the like, having a load-carrying frame member resiliently supported by a wheel assembly base member which includes one or more wheels. The load carrying member is usually the frame of the vehicle, and in a standard truck, there is a base member or wheel assembly at each of the four corners thereof. The measuring apparatus usually includes a variable resistant unit for each wheel assembly base member. Each variable resistance unit comprises a resistance track mounted on one of said vehicle members near said other member. A wiper arm is provided for the track and in the preferred form of the invention, is normally spaced therefrom, said arm and resistance track being mounted for relative longitudinal movement, that is in effect the arm moves longitudinally of the track. Actuating means is connected to said other member for causing relative movement between the arm and track in accordance with relative movement between the load carrying member and the base member consequent upon variations in the load on said carrying member. The resistance unit preferably includes means at the wiper arm for selectively moving said arm into engagement with the resistance track. Electrical circuit means including a power source and an indicator unit are mounted at a convenient place on the vehicle. The indicator unit may be located at or near the dash board of the vehicle. Means is provided for connecting the track and wiper arm of the varible resistance unit to said circuit means, said indicator unit being calibrated to provide an indication of the load associated with said resistance unit.

It is desirable to provide a variable resistance unit near and for each wheel assembly of the vehicle. The track and wiper arm of each variable resistance unit is connected to the electrical circuit means. This means preferably includes a switching arrangement such that the indicator unit can provide an indication of the load associated with any one of the resistance, or with all of them.

One of the great problems today is to prevent the overloading of heavy trucks which travel on the highways. There are limits set for each entire truck and for each axle of a truck. This makes it imperative that the operator know during loading of his truck when he is approaching the maximum load limit for the entire vehicle, and the maximum load for each axle. Furthermore, in order to keep maintenance to a minimum, the operator should keep the loads in his truck evenly distributed relative to the wheels thereof.

The present apparatus is so simple that a variable resistance unit may be mounted on the truck at each wheel assembly thereof. The apparatus is such that an indication of the load at each wheel may be obtained, as well as an indication of the entire load of the truck. As the load at a wheel assembly increases, the vehicle frame moves downwardly towards its supporting wheel assembly. The resistance unit is so associated with these elements that this movement is registered on an indicator unit which is calibrated to provide an indication of the load causing this movement. A resistance track and wiper arm are used in the resistance unit in such a way that the arm moves over the track as the frame moves towards and away from the wheel assembly. As this is a constant back and forth movement when a truck is travelling along the road, the apparatus is preferably constructed so that the wiper arm is normally separated from the track. Means is provided at said arm for selectively moving it into engagement with the resistance track when it is desired to have an indication of the load. Furthermore, in the preferred form of the invention, the resistance track may be shifted longitudinally relative to the wiper arm to permit of adjustment of the apparatus to suit the "empty" conditions of the vehicle.

Some trucks consist of a trailer which is detachably connected to a tractor unit. The present invention embraces a modification of the measuring apparatus which may be placed under a portion of the forward end of a trailer when said trailer is detached from the tractor unit in order to indicate the load while the trailer is being loaded.

Figure 5:
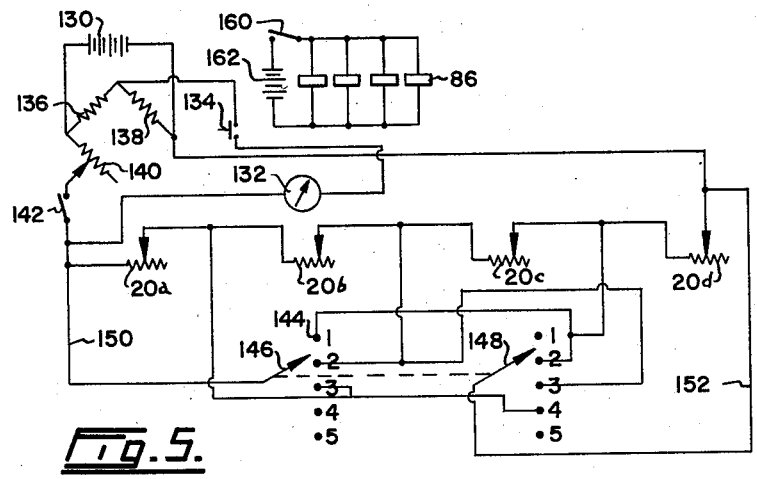
Figure 6:
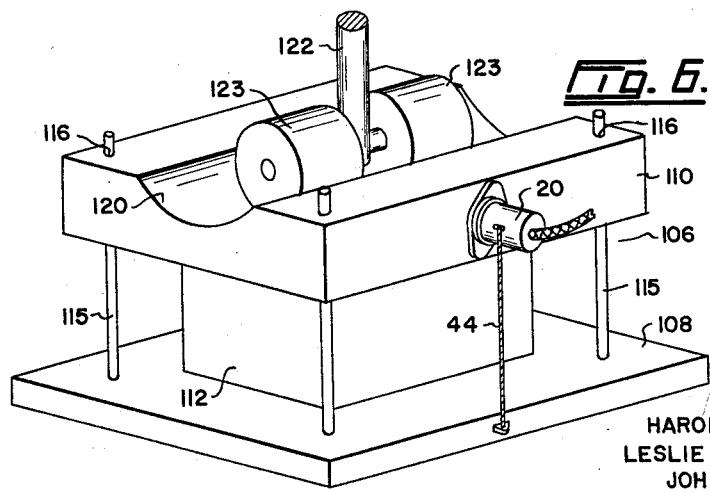
Figure 2:
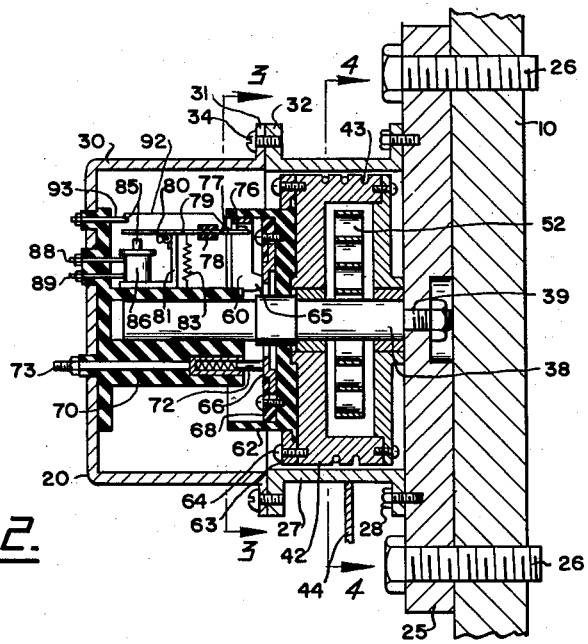
Figure 3:
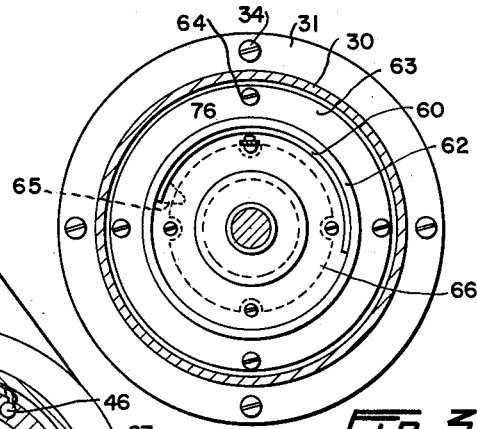
Figure 4:
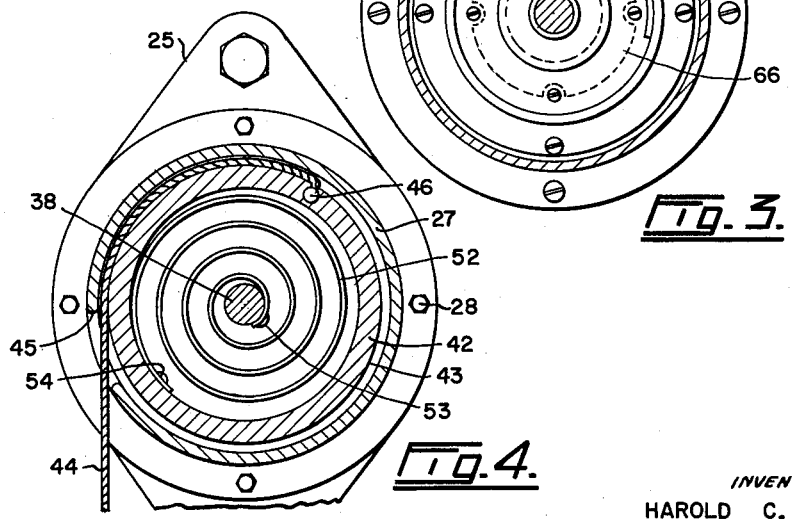

Examples of the present invention are illustrated in the accompanying drawings, in which, FIGURE 1 is a perspective view of a portion of a vehicle frame over an axle or wheel assembly, illustrating one way of mounting this load measuring apparatus, FIGURE 2 is an enlarged vertical section taken substantially on the line 2—2 of FIGURE 1, said section being through the variable resistance unit, FIGURE 3 is a cross section taken on the line 3—3 of FIGURE 2, FIGURE 4 is another cross section taken on the line 4—4 of FIGURE 2, FIGURE 5 is a diagram of the electrical circuits associated with the illustrated measuring apparatus, and FIGURE 6 is a perspective view of load measuring apparatus designed particularly for truck trailers.

Referring to FIGURES 1 to 4 of the drawings, 10 is a carrying member which in this example is part of the frame of a vehicle, such as a truck. A base member is located beneath the carrying member or frame and resiliently supports the latter through springs 12. The base member or wheel assembly includes an axle 13, the adjacent end of which is carried by one or more wheels, which have been omitted for the sake of clarity. The central portion of spring 12 rests upon and is connected to axle 13 in the customary manner and the ends of the spring are connected to frame 10 by brackets 16 and 17, this also being standard equipment.

A variable resistance unit 20 is provided. This unit is preferably mounted on frame 10 over the wheel assembly member 11, as clearly shown in FIGURE 1, but it is to be understood that the unit could possibly be mounted on the wheel assembly member instead. The latter mounting is not recommended since the unit would be subjected to a great deal of vibration while the truck was in motion. The details of resistance unit 20 are illustrated in FIGURES 2 to 4. This unit includes a base plate 25 which is secured to the side of frame 10 in any desired manner, such as by bolts 26. The unit also includes a casing 27 removably mounted on plate 25 by bolts 28, and a relatively large cover 30 having a flange 31 matching a flange 32 on the outer end of casing 27, said flanges being removably connected together by bolts 34. A shaft 38 is secured to base plate 25 at 39 and projects outwardly from said plate through casing 27 into cover 30 centrally thereof. A drum 42 is rotatably mounted on shaft 38 within casing 27, said drum having a groove 43 therein in which lays a cable 44. This cable extends through an opening 45 in housing 27, is wrapped part way around drum 42 and is fixedly secured to the periphery thereof at 46, see FIGURE 4. The outer or lower end of cable 44 is connected to the wheel assembly base member 11 at 49 in any convenient manner, as shown in FIGURE 1. If unit 20 were on the wheel assembly, the free end of cable 41 would be connected to frame 10.

Suitable means is provided for resisting the rotation of drum 42 when cable 44 is drawn outwardly from casing 27, and for returning the drum when the cable is released. In this example, a spiral clock spring 52 is mounted within the drum around shaft 38. The inner end of the spring is connected to the shaft at 53 while the outer end of said spring is connected to the inner surface of the drum at 54. The spring is wound so that when cable 44 is drawn outwardly, the spring is tightened, and when the cable is released, the spring turns the drum to wind the cable inwardly of casing 27.

A resistance track 60 is mounted in unit 20 for movement with drum 42. In this example, an annular flange 62 formed of insulating material is releasably mounted on the drum by a mounting ring 63, which is removably secured to the drum by screws 64. This flange extends around and is concentric with shaft 38 in cover 30. One end of track 60 is connected by a lug 65 to a conducting ring 66 which is carried by an insulating base 68 at the inner end of and connected to flange 62. A cylindrical insulating block 70 is carried by cover 30 and fits over the outer end of shaft 38. This block carries a carbon brush 72 which normally bears against ring 66, said brush being connected to a conductor 73 which extends through and is insulated from cover 30.

A wiper arm 76 is provided for the resistance track 60. In this preferred form of the invention, arm 76 is normally spaced from the resistance track, as shown in FIGURE 2. Arm 76 consists of an outer section 77 connected by insulation 78 to an inner section 79, the latter being mounted by a hinge 80 on support 81 carried by block 70 and projecting outwardly therefrom. Arm 76 is drawn against the outer end of support 81 by a spring 83, at which time said wiper arm is spaced from track 60. The opposite end 85 of the wiper arm is normally positioned slightly away from the core of a solenoid 86 mounted on block 70, the opposite ends of the coil of this solenoid being connected to conductors 88 and 89, which extend through and are insulated from cover 30. Section 77 of wiper arm 76 is connected by a flexible wire 92 to a conductor 93 which also extends through and is insulated from cover 30.

Conductors 73 and 93 are connected to an indicating circuit. Conductors 88 and 89 are connected to a circuit including a switch and a source of power for energizing and de-energizing solenoid 86. When this solenoid is energized, section 77 of wiper arm 76 is swung into engagement with resistance track 60 so that there is a circuit formed by conductor 93, wire 92, arm 76, track 60, lug 65, ring 66, brush 72 and conductor 73. This circuit is broken when solenoid 86 is de-energized and wiper arm 76 is drawn away from the resistance track by spring 83. The resistance in said circuit, when the apparatus is at rest, may be varied by loosening screws 64 and mounting ring 63, and rotating flange 62 to shift track 60 longitudinally relative to wiper 76.

As a load is applied to frame 10, the latter moves towards wheel assembly 11. During this time, spring 52 rotates drum 42 to keep cable 44 taut. This causes track 60 to move relative to wiper arm 76, the direction of movement depending upon whether load is being applied to or removed from frame 10.

Wires connected to conductors 73, 93, 88 and 89 extend away from unit 20 through a suitable cable 99.

FIGURE 6 illustrates a modification of the invention incorporating resistance unit 20 described above. This embodiment is particularly for trailers having a front end which is detachably connected to a traction unit. Embodiment 106 includes a base member 108 and a carrying member or platform 110 above said base member. Resilient means, such as a resilient rubber block 112, is carried by base 108, and upon which the carrying member 110 rests. Suitable guide means is provided between the base and platform to maintain the latter horizontal relative to the base during movement towards and away from the latter. In this example, the guide means comprises a plurality of parallel pins 115 rigidly secured to and projecting upwardly from base 108. Each pin slidably extends through an opening 116 formed in platform 110. If desired, the upper surface of platform 110 may be formed with a groove 120 for receiving a trailer wheel or spud. FIGURE 6 shows a spud 122 projecting towards platform 110 and having wheels 123 mounted on its lower end which fit into groove 120 of said platform.

When a trailer is to be disconnected from its tractor unit, one or two, usually two, spuds 122 is or are swung downwardly from the front end of the trailer so that wheels 123 rest on the ground. When embodiment 105 is to be used, the wheels 123 of each spud are placed in groove 120 of platform 110 of one of these units 105 so that the weight of the trailer above is carried by this apparatus. As the load is placed on or removed from the trailer, platform 110 moves towards or away from base 108. Block 112 is compressed as the load increases, and re-asserts itself as the load decreases. Resistance unit 20 functions in exactly the same manner as it does when mounted as shown in FIGURE 1. The variable resistance units 20 (or unit in the case of the embodiment shown in FIGURE 6) are arranged to be connected in a suitable electrical circuit arrangement which enables the total vehicle load or the load on individual wheel assemblies of the vehicle to be determined. The circuit arrangement shown in FIGURE 2 is particularly suitable for this purpose and comprises a Wheatstone bridge circuit energized from a suitable current source indicated at 130 and having a suitable indicator unit 132 connected in the galvanometer circuit thereof. The current source 130 may consist of the storage battery which forms part of the normal equipment of the vehicle, but it is preferably a separate battery specifically employed for the load measuring apparatus. The indicator unit 132 may be any suitably sensitive direct current meter and is preferably calibrated in terms of the load on the wheel assembly or assemblies associated with the resistance unit or units connected to the bridge circuit. Preferably a push button switch 134 is connected in series with the indicator 132 whereby the latter is only connected into circuit and is only energized upon closure of this switch. The resistance units 20 are connected in series to form one arm RS of the Wheatstone bridge network, two of the other arms PQ and QR of the network having standard resistors 136 and 138 connected therein whilst the remaining arm QS includes a variable resistor 140 which may be used to adjust the state of balance of the bridge circuit. If desired a switch 142 may be incorporated in series with the variable resistance units 20 enabling all of the latter units to be disconnected from the bridge circuit as desired.

A switching circuit including a double pole five position selector switch 144 is associated with the variable resistance units 20. The selector switch 144 comprises two banks of contacts having movable selector arms 146 and 148 respectively associated therewith. The two selector arms 146 and 148 are movable in synchronism and are connected by means of leads 150 and 152 to opposite ends of the chain of series-connected variable resistance units 20. The switching circuit is arranged so that for each of positions 1 to 4 of switch 144, a different one of the resistance units 20 is connected in the measuring arm of the bridge circuit whilst in position 5 of switch 144, all of the resistance units 20 are connected in series in the measuring arm of the bridge. The selector switch 144 thus enables any one or all four of the resistance units 20 to be connected in the bridge circuit whereby the load on any selected one of the wheel assemblies or the total load on the vehicle may be determined. If desired, provision may also be made for connecting the variable resistance units associated with a particular axle to facilitate obtaining a direct reading of the total load on an individual axle. As stated above, each resistance unit in the measuring arm of the bridge when the apparatus is at rest may be varied by shifting the resistance track relative to its associated wiper arm.

Each of the wiper arms of the resistance units 20 is normally spaced from its associated resistance track and is movable into engagement with said resistance track by means of a solenoid 86. The operating coils of the solenoids 86 are connected in parallel with each other and with a switch 160 across a suitable direct current power source which may consist of the battery 130 forming the power source for the measuring apparatus but is preferably a separate battery 162.

The bridge circuit parameters are initially selected and adjusted so that with zero load on the vehicle and with the arm RS short circuited, the output of the bridge produces a predetermined deflection, for example full scale deflection of indicator unit 132. Prior to taking actual load measurements, it is first necessary to calibrate the bridge circuit and this is effected by adjusting the resistance of the individual resistance units 20 in turn which, as described hereinabove, may entail shifting each resistance track relative to its associated wiper arm so that zero load on the truck and with each one of the resistance units connected into the bridge circuit in sequence, the indicator gives full scale reading, i.e., each resistance unit is adjusted to produce a short circuit condition in arm R.S. With the individual resistance units 20 adjusted in this manner, it will be appreciated that with any one or with any combination of these units connected in arm RS of the bridge circuit, the indicator 132 will be deflected full scale, i.e., with zero load on the vehicle the bridge circuit is unbalanced to a degree whereat it provides an output corresponding to full scale deflection of indicator unit 132. The bridge is then set up ready for load measurements to be taken and the arrangement is such that the bridge is balanced and the indicator gives zero reading when a predetermined load which may correspond to the load limit is placed on the vehicle. Subsequently any load placed on the vehicle will produce a corresponding variation in the resistance of the units 20 thereby tending to balance the bridge circuit and load on the vehicle is then given by the deviation of the indicator from its full scale reading. When it is desired to take a load reading, switch 160 is first closed to energize the solenoids 86 which are effective to move the wiper arms 76 into engagement with their associated resistance tracks 60. The switch 142 is then closed in order to connect the variable resistance units 20 into the Whitestone bridge circuit. Thereafter by suitable adjustment of the selector switch 144 any one or all of the resistance units 20 may be connected in circuit as desired. With the selector switch 144 set to a desired position, the output of the bridge circuit and consequently the total load or the load on any wheel assembly can then be determined from the indicator unit 132 upon closure of the push-button switch 134. The indicator unit 132 is preferably calibrated to indicate the bridge output in terms of the load associated with the variable resistance unit or units connected thereto, i.e., the indicator unit is calibrated directly in terms of the load placed on the vehicle.

As the conditions such as metal fatigue, wear, etc., of a vehicle change, it is desirable to be able to vary the resistance of each unit 20, and this is accomplished by shifting the resistance track 60 of the unit relative to its wiper arm 76 while the vehicle is unloaded. A further feature of the invention is that in use the apparatus also provides an indication of any change in the unloaded weight distribution characteristics of the vehicle from their initial calibrated condition. Such changes may arise consequent, for example, upon variations in the vehicle spring suspension due to wear or fatigue since any such changes will vary the resistance in the fourth arm of the bridge and will thus vary the output of the bridge circuit. Such changes will be displayed on the indicator unit which with all four resistance units in circuit will indicate any changes in the unloaded total weight of the vehicle and with individual resistance units in circuit will indicate any changes in the loads associated with the corresponding wheel assemblies. Thus, any such changes may be noted from the indicator prior to loading the vehicle and subsequent readings may therefore be corrected to make allowance for any such initial errors thereby obviating the necessity of calibrating the system prior to each and every loading of the vehicle. In this manner therefore the present apparatus enables accurate measurements to be made of the total vehicle load, the load on individual wheel assemblies or the load associated with a particular axle whilst minimizing maintenance problems and obviating the need for recalibrating the system between each measurement.

What we claim as our invention is:

1. In load measuring apparatus for a vehicle, a base, a carrying platform above the base, resilient means carried by the base and upon which the platform rest, guide means between the base and platform to maintain the latter horizontal relative to the base during movement towards and away therefrom; a variable resistance unit comprising a resistance track mounted on the platform, a wiper arm for said track, said arm and resistance track being mounted for relative longitudinal movement, actuating means connected to the base for causing relative movement between the arm and track in accordance with relative movement between the platform and base consequent upon variation in the load of a vehicle, a portion of which is resting on the platform, electrical circuit means including a power source and an indicator unit; and means for connecting the track and wiper arm of said variable resistance unit to said circuit means, said indicator unit being calibrated to provide an indication of the load associated with said resistance unit.

2. In load measuring apparatus for a vehicle, a base, a carrying platform above the base, resilient means carried by the base and upon which the platform rests, guide means between the base and platform to maintain the latter horizontal relative to the base during movement towards and away therefrom; a variable resistance unit comprising a resistance track mounted on the platform, a wiper arm for said track, said arm and resistance track being mounted for relative longitudinal movement, actuating means connected to the base for causing relative movement between the arm and track in accordance with relative movement between the platform and base consequent upon variation in the load of a vehicle, a portion of which is resting on the platform, an electrical bridge circuit; means for connecting the track and wiper arm of variable resistance unit to said bridge circuit; means for energizing said bridge circuit, an electrical indicator unit adapted to be connected to said bridge circuit to provide an indication of the output thereof, said indicator unit being calibrated to provide an indication of the load associated with said resistance unit.

3. A vehicle load measuring apparatus comprising a base member; a load-carrying member resiliently supported by said base member; a variable resistance unit comprising a casing removably mounted on one of said members near said other member, a drum rotatably mounted within said casing, a resistance track connected to and movable with said drum, a wiper arm for said track, means for adjusting the rest position of said drum relative to said wiper arm, biasing means connected to said drum and normally effective to urge said drum towards its rest position, and actuating means connected to said drum and to said other member for rotating said drum away from its rest position against the action of said biasing means thereby to produce relative movement between said arm and said track in accordance with relative movement between the load-carrying member and the base member consequent upon variations in the load on said load-carrying member; an electrical bridge circuit; means energizing said bridge circuit, means connecting the track and wiper arm of said variable resistance unit in one arm of said bridge circuit; and an indicator unit adapted to be connected across said bridge circuit, said indicator unit being calibrated to provide an indication of the load associated with said variable resistance unit.

4. A load measuring apparatus comprising a base member; a load carrying member resiliently supported by said base member; a variable resistance unit comprising a resistance track mounted on one of said members near said other member, a wiper arm for said track normally spaced therefrom, said arm and resistance track being mounted for relative longitudinal movement, actuating means connected to said other member operable to cause relative movement between the arm and the track in accordance with relative movement between said members consequent upon variations in the load on said load carrying member; means for selectively bringing the wiper arm into engagement with the track of the variable resistance unit; an electrical measuring circuit; and means for connecting the track and the wiper arm of said variable resistance unit into said measuring circuit, said measuring circuit being adapted to provide an indication of the load associated with said resistance unit.

5. A load measuring apparatus comprising a base member; a load carrying member resiliently supported by said base member; a variable resistance unit comprising a resistance track mounted on one of said members near said other member, a wiper arm for said track normally spaced therefrom, said arm and resistance track being mounted for relative longitudinal movement, actuating means connected to said other member operable to cause relative movement between the arm and the track in accordance with relative movement between said members consequent upon variations in the load on said load carrying member; means for selectively bringing the wiper arm into engagement with the track of the variable resistance unit; and means for connecting the track and the wiper arm of said variable resistance unit into an electrical measuring circuit, said electrical measuring circuit comprising an electrical bridge circuit which is initially unbalanced to a predetermined amount and adapted to be brought into balance when a predetermined load is placed on said load carrying member, means for energizing said bridge circuit, and an indicator unit adapted to be connected across said bridge circuit, said indicator unit being calibrated to provide an indication of the load associated with said load carrying member.

6. A vehicle load measuring apparatus comprising a base member; a load-carrying member resiliently supported by said base member; a variable resistance unit comprising a resistance track mounted on one of said members for reciprocal movement in a direction longitudinally of said track, a wiper arm for said track, biasing means connected to said track and normally effective to urge the track towards an at rest position, and actuating means connected to said track and to the other member for moving the track away from its rest position against the action of said biasing means thereby to produce relative movement between the wiper arm and the track in accordance with relative movement between the load-carrying member and the base member consequent upon variations in the load on said load-carrying member; an electrical measuring circuit; and means for connecting the track and the wiper arm of said variable resistance unit into said measuring circuit, said measuring circuit being adapted to provide an indication of the load associated with said resistance unit.

7. A vehicle load measuring apparatus as claimed in claim 6 in which the wiper arm is normally spaced from the resistance track, and including means for selectively bringing the wiper arm into engagement with the resistance track.

8. A vehicle load measuring apparatus as claimed in claim 6 including means for adjusting the rest position of the resistance track relative to the wiper arm.

9. A vehicle load measuring apparatus as claimed in claim 6 in which said electrical measuring circuit comprises an electrical bridge circuit which is initially unbalanced to a predetermined amount and adapted to be brought into balance when a predetermined load is placed on said load-carrying member, means for energizing said bridge circuit, and an indicator unit adapted to be connected across said bridge circuit, said indicator unit being calibrated to provide an indication of the load associated with said load-carrying member.

10. A vehicle load measuring apparatus as claimed in claim 9 wherein said resistance unit is adjusted so as to produce a predetermined output from said bridge circuit under zero load conditions on said load-carrying member.

11. A vehicle load measuring apparatus as claimed in claim 7 in which the means for moving the arm into engagement with the resistance track comprises a solenoid mounted near the arm to move said arm into engagement with the track when said solenoid is energized, said solenoid being in a circuit including a source of power and a control switch.

12. A vehicle load measuring apparatus comprising a base member; a load-carrying member resiliently supported by said base member; a variable resistance unit comprising a casing removably mounted on one of said members near said other member, a drum rotatably mounted within said casing, a resistance track connected to and movable with said drum, a wiper arm for said track, biasing means connected to said drum and normally effective to urge said drum towards its rest position, and actuating means connected to said drum and to said other member for rotating said drum away from its rest position against the action of said biasing means thereby to produce relative movement between said arm and said track in accordance with relative movement between the load-carrying member and the base member consequent upon variations in the load on said load-carrying member; an electrical measuring circuit; and means for connecting the track and the wiper arm of said variable resistance unit into said measuring circuit, said measuring circuit being adapted to provide an indication of the load associated with said resistance unit.

References Cited in the file of this patent

UNITED STATES PATENTS

| | | |
|---|---|---|
| 1,407,078 | Murray | Feb. 21, 1922 |
| 2,857,495 | Bourns et al. | Oct. 21, 1958 |
| 3,044,563 | Gumpertz et al. | July 17, 1962 |